(12) United States Patent
Cope

(10) Patent No.: US 7,752,373 B2
(45) Date of Patent: Jul. 6, 2010

(54) SYSTEM AND METHOD FOR CONTROLLING MEMORY OPERATIONS

(75) Inventor: Bryan Cope, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 189 days.

(21) Appl. No.: 11/704,656

(22) Filed: Feb. 9, 2007

(65) Prior Publication Data

US 2008/0195806 A1 Aug. 14, 2008

(51) Int. Cl.
*G06F 13/14* (2006.01)
*G06F 13/00* (2006.01)

(52) U.S. Cl. .................. 710/305; 710/316; 711/111

(58) Field of Classification Search ............. 711/111; 710/316, 305
See application file for complete search history.

(56) References Cited

U.S. PATENT DOCUMENTS

| 5,265,218 | A | 11/1993 | Testa et al. | |
|---|---|---|---|---|
| 5,650,967 | A | 7/1997 | Seibert | |
| 5,956,288 | A | 9/1999 | Bermingham et al. | |
| 5,999,476 | A | 12/1999 | Dutton et al. | |
| 6,088,761 | A | 7/2000 | Aybay | |
| 6,212,599 | B1 * | 4/2001 | Baweja et al. | 711/106 |
| 6,466,736 | B1 | 10/2002 | Chen et al. | |
| 6,523,755 | B2 * | 2/2003 | Shinohara | 235/492 |
| 6,735,712 | B1 * | 5/2004 | Maiyuran et al. | 713/501 |
| 7,360,038 | B2 * | 4/2008 | Onabe et al. | 711/154 |
| 2004/0103243 | A1 * | 5/2004 | Dorst | 711/105 |
| 2005/0080999 | A1 * | 4/2005 | Angsmark et al. | 711/150 |
| 2005/0223121 | A1 * | 10/2005 | Tsai | 710/2 |
| 2006/0265531 | A1 * | 11/2006 | Adams et al. | 710/105 |
| 2007/0033336 | A1 * | 2/2007 | Oh | 711/104 |
| 2008/0183942 | A1 * | 7/2008 | Jeong | 710/316 |

* cited by examiner

*Primary Examiner*—Khanh Dang
*Assistant Examiner*—Christopher A Daley
(74) *Attorney, Agent, or Firm*—Toler Law Group

(57) ABSTRACT

A system and method for controlling memory operations is disclosed. In a particular embodiment, the system includes a memory controller that can request control of a contact that is shared between a first memory device and a second memory device. In a particular embodiment, the memory controller includes a state machine to request and receive control of the contact. In another particular embodiment, the first memory device is a non-volatile memory device and the second memory device is a volatile memory device.

28 Claims, 5 Drawing Sheets

SYSTEM AND METHOD FOR CONTROLLING MEMORY OPERATIONS

FIELD OF THE DISCLOSURE

The present disclosure is generally related to systems and methods of controlling memory operations.

BACKGROUND

Multiple memory devices can be used in an electronic system. A system processor can provide instructions to multiple memory controllers to operate each memory device. However, dedicating processor resources to coordinate multiple memory controllers can impede system performance. In addition, connecting multiple memory controllers to multiple memory devices can occupy valuable pin connections on a controller. Hence, there is a need for an improved system and method for controlling memory operations.

DETAILED DESCRIPTION OF THE DRAWINGS

In a particular embodiment, a device to control memory operations is disclosed. The device includes a first memory controller and a state machine embedded in the first memory controller. The state machine requests control of at least one pin shareable between a non-volatile memory device and a dynamic random access memory device.

In another embodiment, a system to control memory operations is disclosed. The device includes a first data bus and a second data bus. The device also includes a first memory controller coupled to the first data bus. The device further includes a state machine embedded in the first memory controller. The state machine controls at least one data output pin shareable between a non-volatile memory device and a volatile memory device. The device includes a second memory controller coupled to the first data bus and the second data bus. The second memory controller has a communication path to the state machine. The first memory controller controls the non-volatile memory device and the second memory controller controls the volatile memory device.

In another embodiment, a system to control memory operations is disclosed. The system includes a flash memory device having a first data input coupled to a contact. The system also includes a first memory controller to control the flash memory device. The system also includes a dynamic random access memory (DRAM) device having a second data input coupled to the contact. The system further includes a second memory controller to control the DRAM device. The first memory controller and the second memory controller operate at a first clock frequency. The second memory controller operates at a second clock frequency when a modify clock frequency instruction is received. The second clock frequency is different than the first clock frequency.

In another embodiment, a method of controlling memory operations is disclosed. The method includes sending a request from a first memory controller to a second memory controller to request control of a shared data pin that is coupled to a non-volatile memory device and that is further coupled to a volatile memory device. The method includes receiving a response to the request from the second memory controller. The method further includes asserting control of the shared data pin after receipt of the response.

Figure 1:
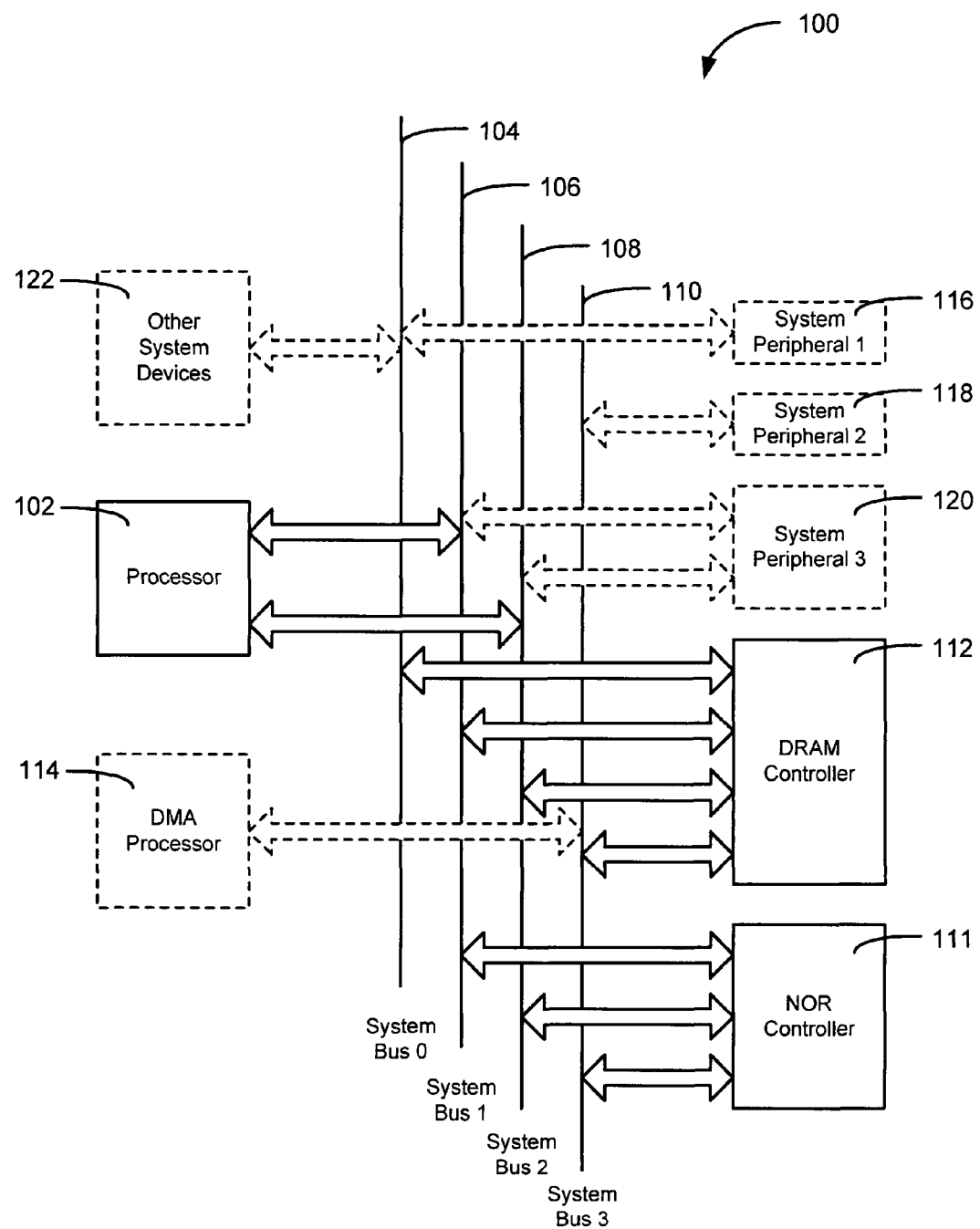
FIG. 1 is a block diagram of a particular illustrative embodiment of a system to control memory operations.

Referring to FIG. 1, a particular illustrative embodiment of a system to control memory operations is depicted and generally designated 100. The system 100 includes a processor 102 coupled to a multi-layer Advanced High-Speed Bus (AHB) that has a first AHB layer bus 104, a second AHB layer bus 106, a third AHB layer bus 108, and a fourth AHB layer bus 110. A Not-OR (NOR) Flash Memory controller 111 is coupled to the second AHB layer bus 106, the third AHB layer bus 108, and the fourth AHB layer bus 110. A Dynamic Random-Access Memory (DRAM) controller 112 is coupled to each of the AHB layer busses 104, 106, 108 and 110. A Direct Memory Access (DMA) processor 114 is coupled to the fourth AHB layer bus 110. A first system peripheral 116 is coupled to the first AHB layer bus 104. A second system peripheral 118 is coupled to the fourth AHB layer bus 110. A third system peripheral 120 is coupled to the second AHB layer bus 106 and the third AHB layer bus 108. Other system devices can be coupled to the AHB, such as a representative system device 122 coupled to the first AHB layer bus 104. In a particular embodiment, the system 100 is a system-on-a-chip integrated circuit (IC) controller that is optimized for use in an audio or video system.

In a particular embodiment, the AHB layer busses 104, 106, 108 and 110 enable parallel processing and communication from system components to the DRAM controller 112. For example, the DRAM controller 112 can receive a first instruction executed by the processor 102 via the second AHB layer bus 106 and can concurrently receive a second instruction executed by the DMA processor 114 via the fourth AHB layer bus 110. As another example, the DRAM controller 112 can also receive parallel processing requests from more than one system device 122 or peripheral 116, 118, and 120 via the AHB.

Figure 2:
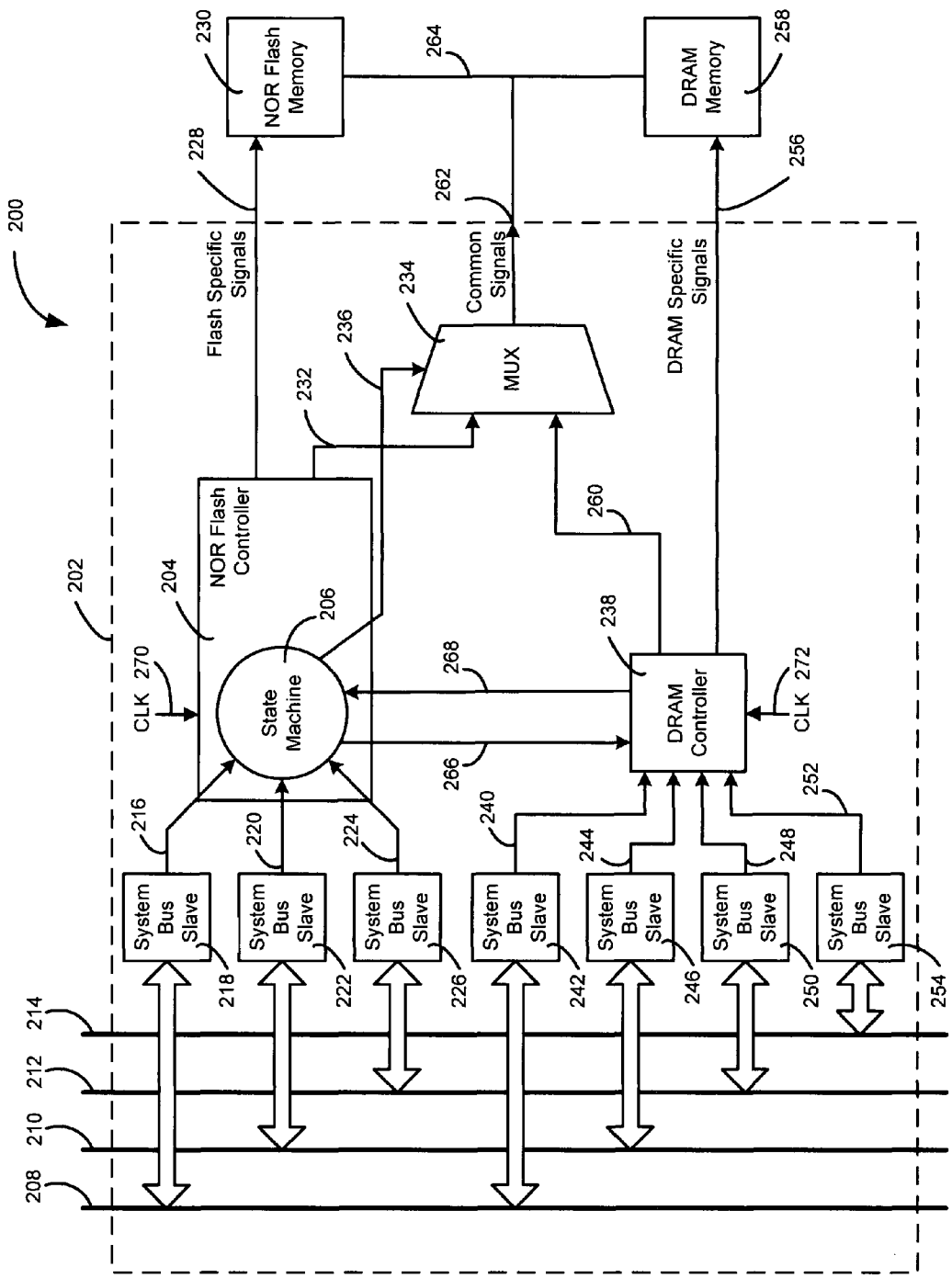
FIG. 2 is a block diagram of another illustrative embodiment of a system to control memory operations.

Referring to FIG. 2, a particular illustrative embodiment of a system to control memory operations is depicted and generally designated 200. The system 200 includes a system-on-a-chip (SOC) 202 coupled to a multilayer Advanced High-Speed Bus (AHB) that includes a first AHB layer bus 208, a second AHB layer bus 210, a third AHB layer bus 212, and a fourth AHB layer bus 214. A first system bus slave 218 is coupled to the first AHB layer bus 208 and is further coupled to a first memory controller 204 via a first signal input 216. A second system bus slave 222 is coupled to the second AHB layer bus 210 and is further coupled to the first memory controller 204 via a second signal input 220. A third system bus slave 226 is coupled to the third AHB layer bus 212 and is further coupled to the first memory controller 204 via a third signal input 224.

A fourth system bus slave 242 is coupled to the first AHB layer bus 208 and is further coupled to a second memory controller 238 via a fourth signal input 240. A fifth system bus slave 246 is coupled to the second AHB layer bus 210 and is further coupled to the second memory controller 238 via a fifth signal input 244. A sixth system bus slave 250 is coupled to the third AHB layer bus 212 and is further coupled to the second memory controller 238 via a sixth signal input 248. A seventh system bus slave 254 is coupled to the fourth AHB layer bus 214 and is further coupled to the second memory controller 238 via a seventh signal input 252.

The first memory controller 204 includes logic 206 that functions as a state machine. The first memory controller 204 is coupled to the second memory controller 238 via communication lines 266 and 268. The first memory controller 204 is further coupled to a first memory device 230. In a particular embodiment, the first memory device 230 is a non-volatile memory device. In a specific embodiment, the first memory device 230 is a Not-OR (NOR) flash memory device and the first memory controller 204 is a NOR flash controller.

The second memory controller 238 is coupled to a second memory device 258. In a particular embodiment, the second memory device 258 is a volatile memory device. In a specific embodiment, the second memory device 258 is a Dynamic Random-Access Memory (DRAM) device and the second memory controller 238 is a DRAM controller.

A multiplexer 234 has a first input from the first memory controller 204 via a first data path 232. The multiplexer 234 also has a second input from the second memory controller 238 via a second data path 260. In a particular embodiment, the multiplexer 234 can dynamically select data from either the first data path 232 or the second data path 260 in response to a control signal output 236 from the logic 206. An output of the multiplexer 234 is coupled to the first memory device 230 and the second memory device 258 via a shared contact 262. In a particular embodiment, the shared contact 262 is one or more data output pins of the SOC 202.

In a particular embodiment, both the first memory device 230 and the second memory device 258 are coupled to a memory data bus 264 to receive a common data signal via the shared contact 262. In a specific embodiment, the memory data bus 264 can be a multi-bit data bus that carries a sixteen-bit data signal and multiple control signals, and the shared contact 262 can include multiple shared output pins of the SOC 202. In another specific embodiment, the shared contact 262 can be a single pin that provides a serial output signal to the memory data bus 264.

In a particular embodiment, the first memory controller 204 can receive a first clock signal input 270 and the second memory controller 238 can receive a second clock signal input 272. The first clock signal input 270 and the second clock signal input 272 can be a common clock signal from an external clock circuit (not shown). In a particular embodiment, the external clock circuit can generate a common clock signal at a first clock frequency for both of the first memory controller 204 and the second memory controller 238 when the first memory controller 204 performs memory operations and can generate a common clock signal at a second clock frequency for both of the first memory controller 204 and the second memory controller 238 when the second memory controller 238 performs memory operations. In a specific embodiment, by adjusting the common clock signal frequency for both of the first memory controller 204 and the second memory controller 238, lower power consumption can be achieved than by operating both memory controllers 204 and 238 at a constant clock frequency. In a specific embodiment, the second clock frequency can be predetermined to reduce a number of cycles performed by the second memory controller 238 over a time period to reduce power consumption.

Referring to FIG. 2, during operation, the second memory controller 238 can receive requests and instructions to perform memory operations from the system bus slaves 242, 246, 250, and 254. In a particular embodiment, the second memory controller 238 has primary control of the shared contact 262. In a particular embodiment, the logic 206 can reside in a default state that grants control of the shared contact 262 to the second memory controller 238 via the control signal 236 causing the multiplexer 234 to select the second data path 260.

In a particular embodiment, the second memory controller 238 can send a signal output 256 to the second memory device 258. In a specific embodiment, the signal output 256 can include a write enable signal, a read enable signal, a memory address, or any combination thereof. In a particular embodiment, the second memory device 258 can receive the signal 256 via a pin or other contact to the SOC 202. The second memory controller 238 can also communicate data to the second memory device 258 via the shared contact 262.

In a particular embodiment, the logic 206 can receive an input signal 216, 220, 224, or any combination thereof, that indicates a request to read or write data to the first memory device 230. In response, the logic 206 can initiate an exchange of handshaking signals with the second memory controller 238 via the first communication path 266 and the second communication path 268 to coordinate access to the shared contact 262. When the read or write request is received, the logic 206 can send a pin request signal to the second memory controller 238 via the first communication path 266 and can enter a pin request waiting state.

Upon receiving the pin request signal, the second memory controller 238 can complete or halt data transfer to the second memory device 258. The second memory controller 238 can then send a pin grant signal to the logic 206 via the second communication path 268. In a particular embodiment, the pin request signal can cause the second memory controller 238 to send a control signal to the second memory device 258 to enter a self-refresh mode to prepare for a period of inactivity while the first memory controller 204 controls the shared contact 262. The second memory device 258 can respond to the control signal from the second memory controller 238 by transitioning to a self-refresh mode to maintain data integrity at the second memory device 258.

When the logic 206 receives the pin grant signal from the second memory controller 238 via the communication path 268, the logic 206 can send a control signal output 236 that causes the multiplexer 234 to select data received via the first data path 232 to be output at the shared contact 262. In addition, the logic 206 can send a clock adjust signal to the second memory controller 238 indicating that the external clock circuit has changed the clock frequency. The second memory controller 238 can synchronize to the new clock frequency and return a clock adjust complete signal to the logic 206 when the synchronization is complete.

In a particular embodiment, the first memory controller 204 can generate a signal output 228 that can be received at the first memory device 230 via a pin or other contact of the SOC 202. In a specific embodiment, the signal output 228 can include a read enable signal, a write enable signal, a memory address, or any combination thereof.

When the first memory controller has control of the shared contact 262, the first memory controller 204 can read or write data to the first memory device 230. When first memory controller 204 has completed memory operations, the logic 206 can send a control signal output 236 that causes the multiplexer 234 to select data received via the second data path 260 to be output at the shared contact 262. The logic 206 also sends a pin request stop signal via the first communication path 266 indicating access to the shared contact 262 is no longer requested. In a specific embodiment, the pin request stop signal can be the termination of the pin request signal.

The second memory controller 238 can receive the pin request stop signal. In a particular embodiment, the second memory controller 238 can send a signal via the signal output 256 to the second memory device 258 to resume operating at the second operation frequency. The second memory controller 238 can also prepare to resume data transfer via the second data path 260 and the memory data bus 264. In a particular embodiment, the second memory controller 238 can further send a signal to the second memory device 258 to exit the self-refresh operation mode. The second memory controller can send a pin grant stop signal to the logic 206. In a specific embodiment, the pin grant stop signal can be the termination of the pin grant signal.

When the logic 206 receives the pin grant stop signal from the second memory controller 238, the logic 206 can return to the default state. The logic 206 can return control of the shared contact 262 to the second memory controller 238 by sending a signal 236 that causes the multiplexer 234 to select data received via second data path 260. Data read and write operations can then resume at the second memory device 258 via the shared contact 262.

In a particular embodiment, the logic 206 can request control of the multiplexer output 234 and the first memory controller 204 can assert control of the multiplexer output to the shared contact 262 without software interaction. Thus, control of the shared contact 262 and the memory data bus 264 can be shared without consuming system processor resources to coordinate the transfer of control between the first memory controller 204 and the second memory controller 238.

Figure 3:
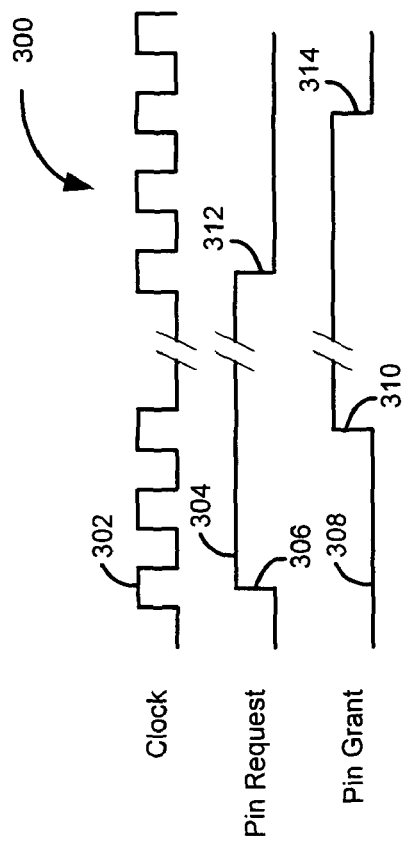
FIG. 3 is a timing diagram of a particular illustrative embodiment of a system to control memory operations.

Referring to FIG. 3, a timing diagram of a particular illustrative embodiment of a system to control memory operations is depicted and generally designated 300. In a particular embodiment, the timing diagram 300 can illustrate a handshaking process between a first memory controller, such as the first memory controller 204, and a second memory controller, such as the second memory controller 238, that share a common contact or set of pins, such as the shared contact 262, for data transfer to a first memory device and a second memory device. A clock signal 302 depicts a system clock signal. A pin request signal 304 transitions from a non-request state to a request state at transition 306. In a specific embodiment, the transition 306 indicates a request for control of the shared contact that is sent by the first memory controller to the second memory controller.

Following the pin request state transition 306, a pin grant signal 308 transitions from a non-pin grant state to a pin grant state at transition 310. In a specific embodiment, the transition 310 indicates a granting of control of the shared contact that is sent by the second memory controller to the first memory controller.

At transition 312, the pin request signal 304 returns to the non-request state. In a specific embodiment, the transition 312 is generated by the first memory controller to signal to the second memory controller that control of the shared contact is no longer requested by the first memory controller.

At transition 314, the pin grant signal 308 returns to the non-grant state. In a specific embodiment, the transition 314 is generated by the second memory controller to signal to the first memory controller that control of the shared contact is no longer granted by the second memory controller. The break in the clock signal 302, the pin request signal 304, and the pin grant signal 308 indicates a period where a variable number of clock cycles may occur without a transition of the pin request signal 304 or the pin grant signal 308.

Figure 4:
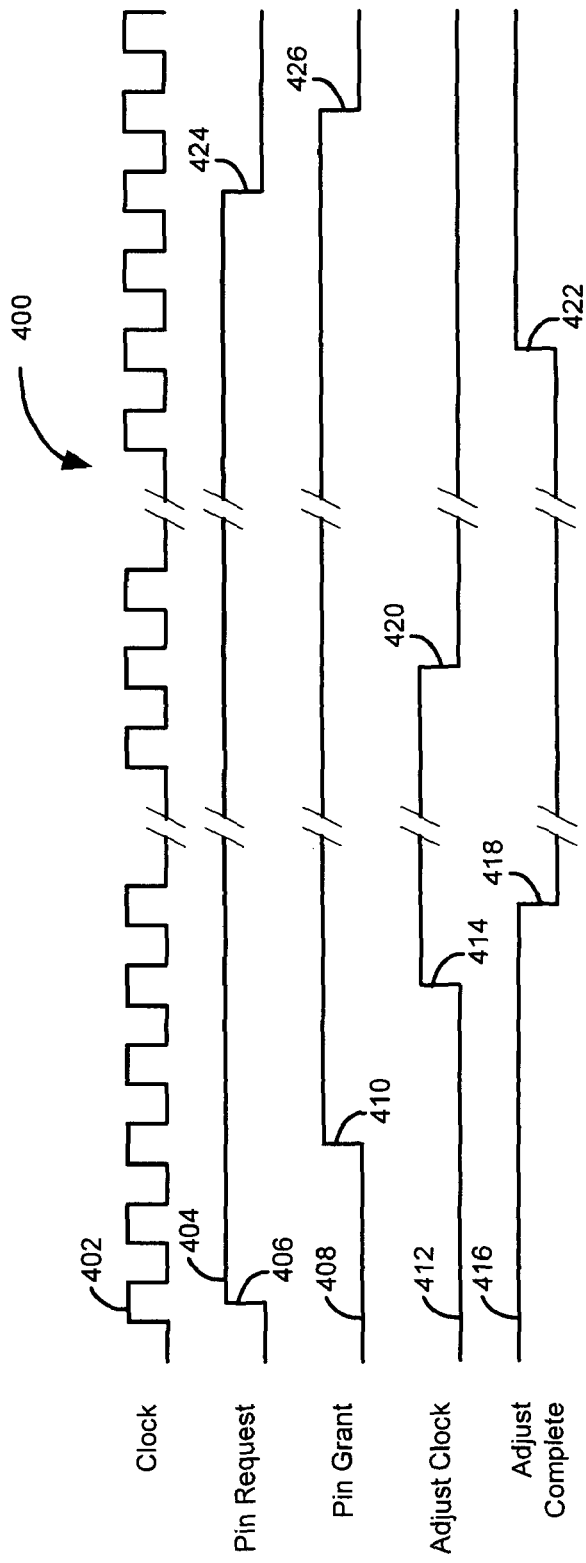
FIG. 4 is a timing diagram of another illustrative embodiment of a system to control memory operations.

Referring to FIG. 4, a timing diagram of a particular illustrative embodiment of a system to control memory operations is depicted and generally designated 400. In a particular embodiment, the timing diagram 400 can illustrate a handshaking process between a first memory controller, such as the first memory controller 204, and a second memory controller, such as the second memory controller 238, that share a common contact or set of pins for data transfer, such as the shared contact 262, to a first memory device and a second memory device.

A clock signal 402 depicts a system clock signal. A pin request signal 404 transitions from a non-request state to a request state at transition 406. In a specific embodiment, the transition 406 indicates a request for control of the shared contact that is sent by the first memory controller to the second memory controller.

Following the pin request state transition 406, a pin grant signal 408 transitions from a non-pin grant state to a pin grant state at transition 410. In a specific embodiment, the transition 410 indicates a granting of control of the shared contact that is sent by the second memory controller to the first memory controller.

After the pin grant transition 410, an adjust clock signal 412 transitions from a clock stable signal to a clock adjustment signal at transition 414. In a particular embodiment, the adjust clock signal transition 414 can be generated by the first memory controller to signal a volatile memory device, such as a DRAM device, to discontinue operation at a normal clock frequency and to begin operation at a different or new clock frequency. In a particular embodiment, the adjust clock signal transition 414 can cause the volatile memory device to enter a self-refresh mode.

In response to the adjust clock transition 414, an adjust complete signal 416 transitions to a low state at transition 418, indicating that synchronization to a clock signal is being performed. In a specific embodiment, the transition 418 is generated by the second memory controller to signal to the first memory controller that synchronization to a different or new clock frequency has not been completed.

The adjust clock signal 412 returns to the clock stable signal at transition 420. In a particular embodiment, the adjust clock signal transition 420 can be generated by the first memory controller to signal to the second memory controller that a clock signal has stabilized after transitioning to a different or new clock frequency. The second memory controller can respond to the adjust clock signal transition 420 by synchronizing to the different or new clock frequency.

The adjust complete signal 416 returns to a high state at transition 422. In a specific embodiment, the transition 422 is generated by the second memory controller to signal to the first memory controller that synchronization to the new clock frequency is complete.

At transition 424, the pin request signal 404 returns to the non-request state. In a specific embodiment, the transition 424 is generated by the first memory controller to signal to the second memory controller that control of the shared contact is no longer requested by the first memory controller.

At transition 426, the pin grant signal 408 returns to the non-grant state. In a specific embodiment, the transition 426 is generated by the second memory controller to signal to the first memory controller that control of the shared contact is no longer granted by the second memory controller. Breaks in the clock signal 402, the pin request signal 404, the pin grant signal 408, the adjust clock signal 412, and the adjust complete signal 416 indicate periods where a variable number of clock cycles may occur without a transition of the pin request signal 404, the pin grant signal 408, the adjust clock signal 412, or the adjust complete signal 416.

Figure 5:
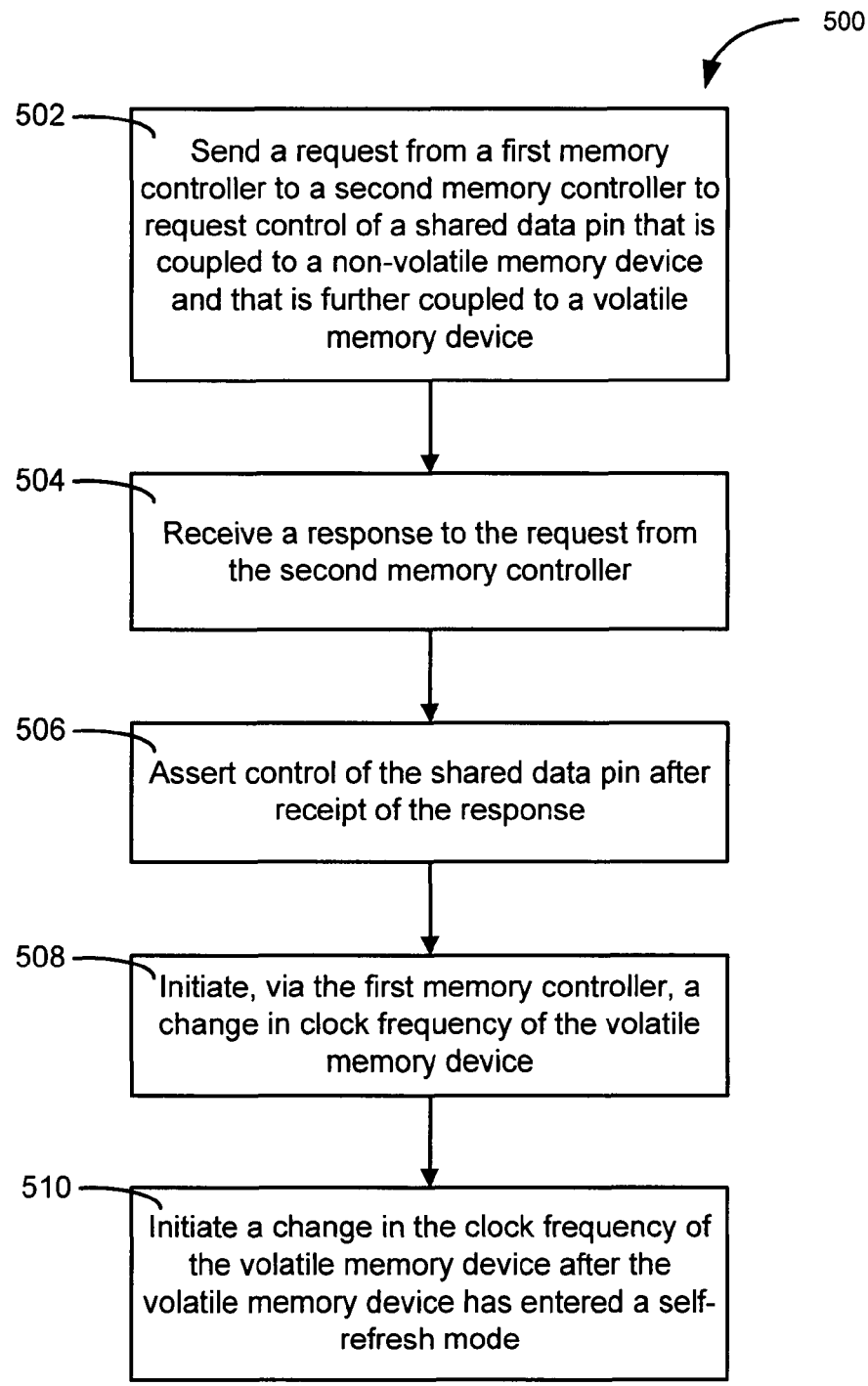
FIG. 5 is a flow chart depicting a particular illustrative embodiment of a method of controlling memory operations.

Referring to FIG. 5, a flow chart depicting a particular illustrative embodiment of a method of controlling memory operations is depicted and generally designated 500. A request is sent from a first memory controller to a second memory controller to request control of a shared data pin that is coupled to a non-volatile memory device and that is further coupled to a volatile memory device, at 502. In a particular embodiment, the non-volatile memory device can be a flash memory device and the volatile memory device can be a DRAM device. A response to the request is received from the second memory controller, at 504. Control of the shared data pin is asserted after receipt of the response, at 506. In a particular embodiment, the volatile memory device can be responsive to the second memory controller, which by default controls the shared data pin. That is, the shared data pin can be controlled by the second memory controller unless memory operations are requested at the non-volatile memory.

In a particular embodiment, a change in a clock frequency of the volatile memory device is initiated via the first memory controller, at 508. In a specific embodiment, the change in the clock frequency can enable the volatile memory device to operate at a reduced power consumption while data transfer via the shared pin is directed to the non-volatile memory device. In a particular embodiment, a change in the clock frequency of the volatile memory device is initiated after the volatile memory device has entered a self-refresh mode, at 510.

Figure 6:
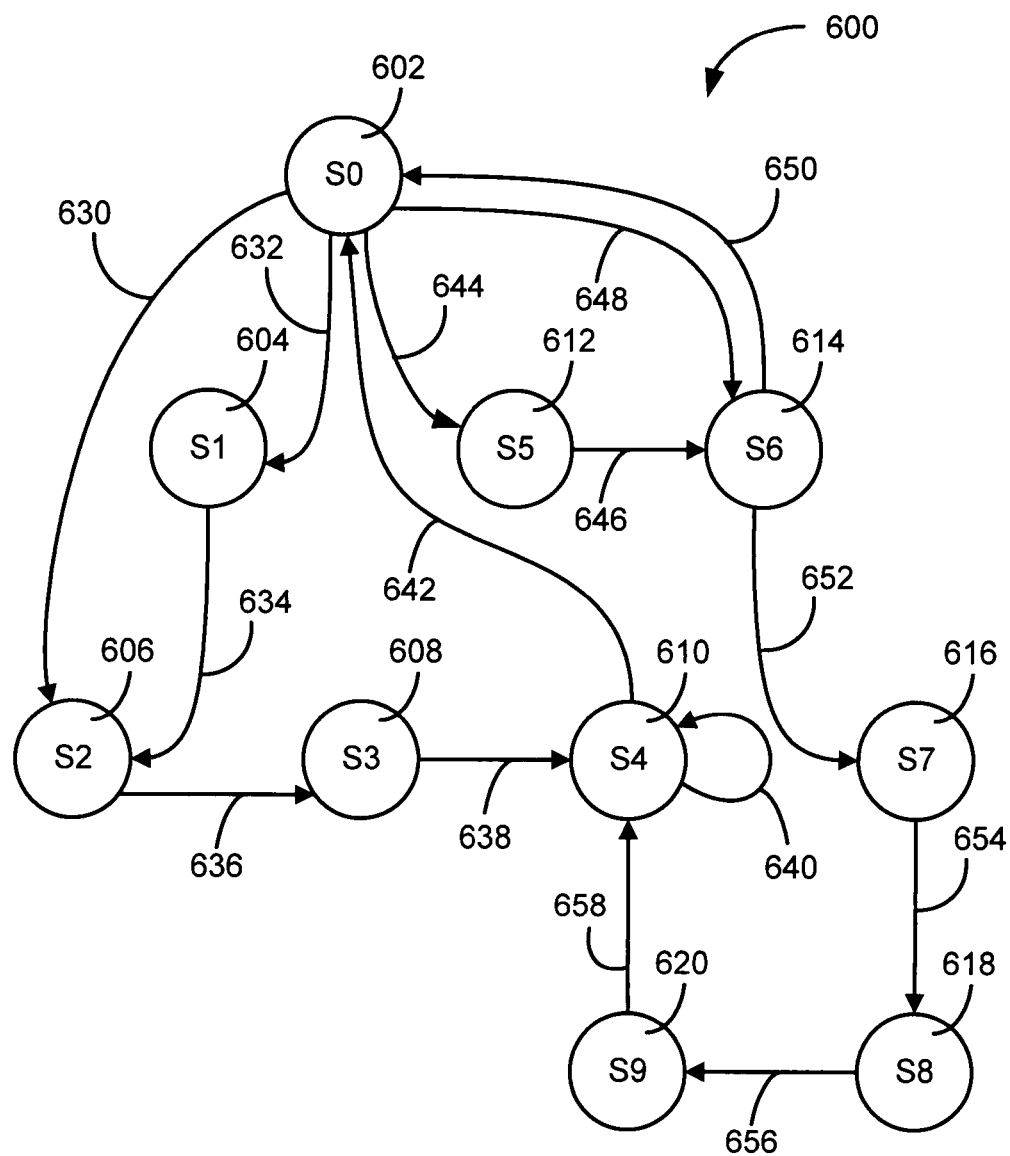
FIG. 6 is a state diagram of a particular embodiment of a system to control memory operations.

Referring to FIG. 6, a particular embodiment of operational states of a system to control memory operations is depicted and generally designated 600. The operational states 600 include a S0 state 602, a S1 state 604, a S2 state 606, a S3 state 608, a S4 state 610, a S5 state 612, a S6 state 614, a S7 state 616, a S8 state 618, and a S9 state 620. In a particular embodiment, the operational states 600 may be logical states of a first memory controller that shares an output pin with a second memory controller. In a specific embodiment, the operation states 600 may be states of the logic 206.

From the S0 state 602, operation proceeds to the S1 state 604 when a start signal is received and handshaking required signal is received, at transition 632. In a particular embodiment, the start signal may indicate that data operations are ready to begin at a first memory device that controlled by a first memory controller. In a particular embodiment, the handshaking required signal may indicate that the first controller must request and be granted permission from the second memory controller to perform the data operations via the shared output pin.

From the S1 state 604, operation proceeds to the S2 state 606 when a pin access grant signal is received at transition 634. Operation can also proceed from the S0 state 602 to the S2 state 606 when the start signal is received but a handshaking not required signal is received at transition 630.

From the S2 state 606, operation proceeds to the S3 state 608 when a complete signal is received at transition 636. In a particular embodiment, the complete signal may indicate that the memory operations have been completed at the first memory device.

Operation automatically proceeds from the S3 state 608 to the S4 state 610 at transition 638. Operation continues at the S4 state as long as a counter value has not met or exceeded a predetermined threshold value, at transition 640. In a particular embodiment, the predetermined threshold value can be set to ensure that the second memory controller has sufficient time to perform memory operations. In a particular embodiment, the predetermined threshold value can indicate an amount of time that ensures the second memory controller is allowed to perform memory operations between the first memory controller's operations.

From the S4 state 610, operation returns to the S0 state 602 when the counter value has met or exceeded the predetermined threshold value, at transition 642.

From the S0 state 602, operation proceeds to the S5 state 612 when a clock change request signal is received and the handshake required signal is received at transition 644. In a particular embodiment, the clock change request signal may indicate that a clock signal is transitioning to a new clock frequency. In a specific embodiment, the clock change request signal can cause the second memory controller to place a second memory device in a self-refresh mode.

From the S5 state 612, operation can proceed to the S6 state 614 when the pin access grant signal is received at transition 646. In addition, operation can proceed from the S0 state 602 to the S6 state 614 when the clock change request signal and the handshake not required signal are received at transition 648.

Operation proceeds from the S6 state 614 to the S7 state 616 when a clock change not requested signal and the handshaking required signal are received at transition 652. In a particular embodiment, the clock change not requested signal may indicate that the clock signal has transitioned to the new clock frequency.

From the S7 state 616, operation proceeds to the S8 state 618 when a clock adjust complete signal is received at transition 654. In a particular embodiment, the clock adjust complete signal may indicate that the second memory device is now operating at a new clock frequency.

From the S8 state 618, operation continues at the next clock cycle to the S9 state 620 at transition 656. Operation proceeds from the S9 state 620 at the next clock cycle to the S4 state 610 at transition 658.

While specific systems and components of systems have been shown, it should be understood that many alternatives are available for such systems and components. In a particular illustrative embodiment, for example, a system to control memory operations may include hardware, software, firmware, or any combination thereof to perform functions and methods of operation as described. It should be understood that particular embodiments may be practiced solely by a processor executing processor instructions and accessing a processor readable memory, or in combination with hardware, firmware, software, or any combination thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. As an example, the first memory device 230, the second memory device 258, or any combination thereof, can be integrated with the system-on-a-chip (SOC) 202. As another example, the multiplexer 234 can be any other logic that enables sharing of one or more pins or contacts. This disclosure is intended to cover any and all subsequent adaptations or variations of various embodiments. Combinations of the above embodiments, and other embodiments not specifically described herein, will be apparent to those of skill in the art upon reviewing the description The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A device to control memory operation, the device comprising:
    a first memory controller;
    a state machine embedded in the first memory controller, the state machine operable to request control of at least one pin shareable between a non-volatile memory device and a dynamic random access memory device, wherein the state machine enters a first state in response to a pin access signal, enters a second state in response to a completion event, enters a third state in response to a clock change request signal, and enters a fourth state in response to a clock adjust complete signal;
    a second memory controller having a communication path to the state machine and having selective control of the at least one shareable pin, the second memory controller responsive to a signal from the state machine to release control of the at least one shareable pin; and
    a clock to generate a first clock signal at a first clock frequency to be applied to the first memory controller and to the second memory controller when the first memory controller performs a memory operation, the clock to generate a second clock signal at a second clock frequency to be applied to the first memory controller and to the second memory controller when the second memory controller performs a memory operation.

2. The device of claim 1, wherein the first memory controller is operable to control the non-volatile memory device and the second memory controller is operable to control the dynamic random access memory device.

3. The device of claim 2, further comprising:
    a multiplexer having a first input coupled to the first memory controller and a second input coupled to the second memory controller, the multiplexer having an output coupled to the at least one shareable pin; and
    wherein the multiplexer dynamically selects either the first memory controller or the second memory controller to control the output of the multiplexer in response to a second signal from the state machine.

4. The device of claim 3, wherein the state machine requests control of the output of the multiplexer over the communication path.

5. The device of claim 4, wherein the first memory controller asserts control over the output of the multiplexer when allowed by the second memory controller.

6. The device of claim 5, wherein the first memory controller further comprises hardware logic that provides a signal to trigger the state machine to request control of the output of the multiplexer.

7. The device of claim 2, wherein the first memory controller is a flash memory controller.

8. The device of claim 1, wherein the second clock frequency is predetermined to reduce a number of cycles performed by the second memory controller over a time period to reduce power consumption.

9. The device of claim 1, wherein the state machine enters a fifth state in response to a handshaking required signal, enters a sixth state in response to a handshaking not required signal, enters a seventh state in response to a counter threshold value signal, and enters an eighth state in response to a clock change not requested signal.

10. A system to control memory operations, the system comprising:
    a first data bus;
    a second data bus;
    a first memory controller coupled to the first data bus;
    a state machine embedded in the first memory controller, wherein the state machine controls at least one data output pin shareable between a non-volatile memory device and a volatile memory device, wherein the state machine enters a first state in response to a pin access signal indicating access to the at least one shareable pin;
    a second memory controller coupled to the first data bus and the second data bus, the second memory controller having a communication path to the state machine and having selective control of the at least one data output pin, the second memory controller responsive to the state machine to release control of the at least one data output pin;
    a clock to generate a first clock signal at a first clock frequency to be applied to the first memory controller and to the second memory controller when the first memory controller performs a memory operation, the clock to generate a second clock signal at a second clock frequency to be applied to the first memory controller and to the second memory controller when the second memory controller performs a memory operation; and
    wherein the first memory controller controls the non-volatile memory device and the second memory controller controls the volatile memory device.

11. The system of claim 10, further comprising:
    a third data bus;
    a fourth data bus;
    wherein the first memory controller is coupled to the first data bus, the third data bus, and the fourth data bus; and
    wherein the second memory controller is coupled to the first data bus, the second data bus, the third data bus, and the fourth data bus.

12. The system of claim 10, wherein the state machine controls multiple pins shareable between the non-volatile memory device and the volatile memory device.

13. The system of claim 10, further comprising:
    a multiplexer having a first input coupled to the first memory controller and a second input coupled to the second memory controller, the multiplexer having an output coupled to the at least one data output pin;

wherein the multiplexer selects either the first memory controller or the second memory controller to control the output of the multiplexer.

14. The system of claim 13, wherein the first memory controller and the second memory controller receive commands in parallel.

15. The system of claim 10, wherein a pin request signal causes the second memory controller to send a control signal to the volatile memory device to enter a self-refresh mode to prepare for a period of inactivity while the first memory controller controls the at least one data output pin.

16. The system of claim 10, wherein the state machine enters a second state in response to receiving a clock frequency adjustment signal.

17. A system to control memory operations, the system comprising:
- a flash memory device having a first data input coupled to a contact;
- a first memory controller to control the flash memory device;
- a dynamic random access memory (DRAM) device having a second data input coupled to the contact;
- a state machine embedded in the first memory controller, the state machine operable to request control of the contact, wherein the state machine enters a first state in response to a pin access signal, enters a second state in response to a completion event, enters a third state in response to a clock change request signal, and enters a fourth state in response to a clock adjust complete signal;
- a second memory controller to control the DRAM device and having selective control of the contact, the second memory controller responsive to a signal from the first memory controller to release control of the contact; and
- a clock to generate a first clock signal at a first clock frequency to be applied to the first memory controller and to the second memory controller when the first memory controller performs a memory operation, the clock to generate a second clock signal at a second clock frequency to be applied to the first memory controller and to the second memory controller when the second memory controller performs a memory operation.

18. The system of claim 17, wherein the second memory controller instructs the DRAM device to operate in a self-refresh mode when a modify clock frequency instruction is received, and wherein the first memory controller controls the contact during a time period when the second memory controller operates at the second clock frequency.

19. The system of claim 17, further comprising:
- a multiplexer having a first input coupled to the first memory controller and a second input coupled to the second memory controller, the multiplexer having an output coupled to the contact; and
- wherein the multiplexer dynamically selects between the first memory controller and the second memory controller to control the output.

20. The system of claim 17, wherein the second memory controller receives a clock adjust signal indicating that the first clock frequency has changed.

21. The system of claim 17, wherein the state machine enters a fifth state in response to a handshaking required signal, enters a sixth state in response to a handshaking not required signal, enters a seventh state in response to a counter threshold value signal, and enters an eighth state in response to a clock change not requested signal.

22. A method of controlling memory operations, the method comprising:
- sending a request from a first memory controller to a second memory controller to request control of a shared data pin that is coupled to a non-volatile memory device and that is further coupled to a volatile memory device, the second memory controller having selective control of the shared data pin and being responsive to a state machine of the first memory controller to release control of the shared data pin, wherein the state machine enters a first state in response to a pin access signal indicating access to the at least one shareable pin;
- receiving a response to the request from the second memory controller, the response indicative of a release of control of the shared data pin by the second memory controller;
- generating a first clock signal at a first clock frequency to be applied to the first memory controller and to the second memory controller when the first memory controller performs a memory operation;
- generating a second clock signal at a second clock frequency to be applied to the first memory controller and to the second memory controller when the second memory controller performs a memory operation; and
- asserting by the first memory controller control of the shared data pin after receipt of the response.

23. The method of claim 22, wherein the response identifies when the first memory controller can have control of the shared data pin.

24. The method of claim 22, wherein the first memory controller further comprises a hardware state machine and wherein the first memory controller includes hardware logic.

25. The method of claim 22, further comprising initiating, via the first memory controller, a change in a clock frequency of the volatile memory device controlled by the second memory controller.

26. The method of claim 25, further comprising initiating a change in a clock frequency of the volatile memory device after the volatile memory device has entered a self-refresh mode.

27. The method of claim 22, wherein the second memory controller synchronizes to a new clock signal in response to a clock adjust signal.

28. The method of claim 22, wherein the state machine enters a second state in response to receiving a clock frequency adjustment signal.

* * * * *